US008015171B2

(12) United States Patent
Gosby et al.

(10) Patent No.: US 8,015,171 B2
(45) Date of Patent: *Sep. 6, 2011

(54) DOCUMENT ANALYSIS AND RETRIEVAL

(75) Inventors: Desiree D. G. Gosby, Allston, MA (US); Keith I Ito, La Verne, CA (US)

(73) Assignee: International Business Machines Corporation, Armonk, NY (US)

( * ) Notice: Subject to any disclaimer, the term of this patent is extended or adjusted under 35 U.S.C. 154(b) by 348 days.

This patent is subject to a terminal disclaimer.

(21) Appl. No.: 12/172,507

(22) Filed: Jul. 14, 2008

(65) Prior Publication Data

US 2008/0270400 A1 Oct. 30, 2008

Related U.S. Application Data

(63) Continuation of application No. 10/334,370, filed on Dec. 30, 2002, now Pat. No. 7,412,453.

(51) Int. Cl.
*G06F 17/00* (2006.01)

(52) U.S. Cl. ........ 707/706; 707/707; 707/711; 707/721; 707/728

(58) Field of Classification Search .................. 707/706, 707/707, 711, 721, 728
See application file for complete search history.

(56) References Cited

U.S. PATENT DOCUMENTS

| 5,715,443 | A | * | 2/1998 | Yanagihara et al. | ................. | 1/1 |
| 5,781,879 | A | * | 7/1998 | Arnold et al. | ................... | 704/9 |
| 5,987,457 | A | | 11/1999 | Ballard | | |
| 6,038,527 | A | * | 3/2000 | Renz | ................. | 704/9 |
| 6,460,034 | B1 | * | 10/2002 | Wical | ................... | 1/1 |
| 6,556,987 | B1 | * | 4/2003 | Brown et al. | ................ | 1/1 |
| 6,820,075 | B2 | * | 11/2004 | Shanahan et al. | ............. | 715/205 |
| 2002/0078044 | A1 | | 6/2002 | Song et al. | | |
| 2002/0099730 | A1 | * | 7/2002 | Brown et al. | ................. | 707/500 |

FOREIGN PATENT DOCUMENTS

JP 11120183 4/1999

(Continued)

OTHER PUBLICATIONS

Lee et al.; Understanding-Based Translingual Information Retrieval, Applications of Natural Language to Information systems; Proceedings of 4th International Conference NLDB '99; pp. 187-195, Published: Wien, Austria, 1999, 275 pp (enclosed 1 sheet—INSPEC).

(Continued)

*Primary Examiner* — Sana Al-Hashemi
(74) *Attorney, Agent, or Firm* — Schmeiser, Olsen & Watts; Daniel McLoughlin

(57) ABSTRACT

A computer system configured to implement a method for document analysis and retrieval. A document that includes text is received from a host. Document keys (i.e., keywords and keyphrases) associated with the text are generated. In first embodiments, a provided document taxonomy has categories and associated category keys (i.e., keywords and keyphrases). The category keys of each category are compared with the document keys to determine a distance between the document and each category as a measure of how close the document is to each category. A subset of the categories is returned to the host, wherein the subset of the categories reflects the determined distances. In second embodiments, a search string is created as a logical function of a subset of the document keys. The search string is submitted to a search engine. Links to related documents are received from the search engine and returned to the host.

4 Claims, 5 Drawing Sheets

FOREIGN PATENT DOCUMENTS

| | | |
|---|---|---|
| JP | 10074250 | 8/1999 |
| JP | 2001344246 | 12/2001 |
| JP | 2002140356 | 5/2002 |
| JP | 20022230001 | 8/2002 |
| WO | WO0033215 | 6/2000 |

OTHER PUBLICATIONS

IBM Technical Disclosure Bulletin, Method of Keyword Categorization, vol. 40, No. 10, Oct. 1987; pp. 51-52.

IBM Technical Disclosure Bulletin, Intelligent Searching of Dynamic Databases, vol. 41, No. 01, Jan. 1998; pp. 647-650.

IBM Technical Disclosure Bulletin, Personalized Information Navigator, vol. 39, No. 08, Aug. 1996; pp. 57-60.

Notice of Allowance (Mail Date Mar. 23, 2011) for U.S. Appl. No. 12/171,395—Filed Jul. 11, 2008; Confirmation No. 2857.

\* cited by examiner

DOCUMENT ANALYSIS AND RETRIEVAL

This application is a continuation application claiming priority to Ser. No. 10/334,370, filed Dec. 30, 2002, now U.S. Pat. No. 7,412,453, issued Aug. 12, 2008.

BACKGROUND OF THE INVENTION

1. Technical Field

The present invention relates generally to a method and system for document analysis and retrieval, and more specifically to a method, system, and algorithm for determining categories and document links relating to a given document.

2. Related Art

Analyzing a given document to determine categories and document links relating to the given document is a slow and inefficient process. Thus, there is a need for an efficient method and system for analyzing documents to determine categories and document links relating to the given document.

SUMMARY OF THE INVENTION

In first embodiments, the present invention provides a method for document analysis and retrieval, comprising the steps of:

receiving a document having text therein from a host of a first computing system;

generating document keys associated with said text from analysis of said text, each said document key selected from the group consisting of a keyword of said text and a keyphrase of said text;

providing a document taxonomy having categories, each category having category keys, each said category key selected from the group consisting of a keyword of said category and a keyphrase of said category;

comparing the category keys of each category with said document keys to make a determination of a distance between the document and each category as a measure of how close the document is to each category; and returning a subset of said categories to said host, wherein said subset of said categories reflects said determination.

In second embodiments, the present invention provides a method for document analysis and retrieval, comprising the steps of:

receiving a document having text therein from a host of a first computing system;

generating document keys associated with said text from analysis of said text, each said document key selected from the group consisting of a keyword of said text and a keyphrase of said text;

creating a search string, said search string comprising a logical function of a subset of said document keys;

submitting said search string to a search engine;

receiving links to related documents from said search engine, said links being based on said search string; and returning said links to said host.

The present invention provides an efficient method and system for analyzing documents to determine categories and document links relating to a given document.

DETAILED DESCRIPTION OF THE INVENTION

Figure 1:
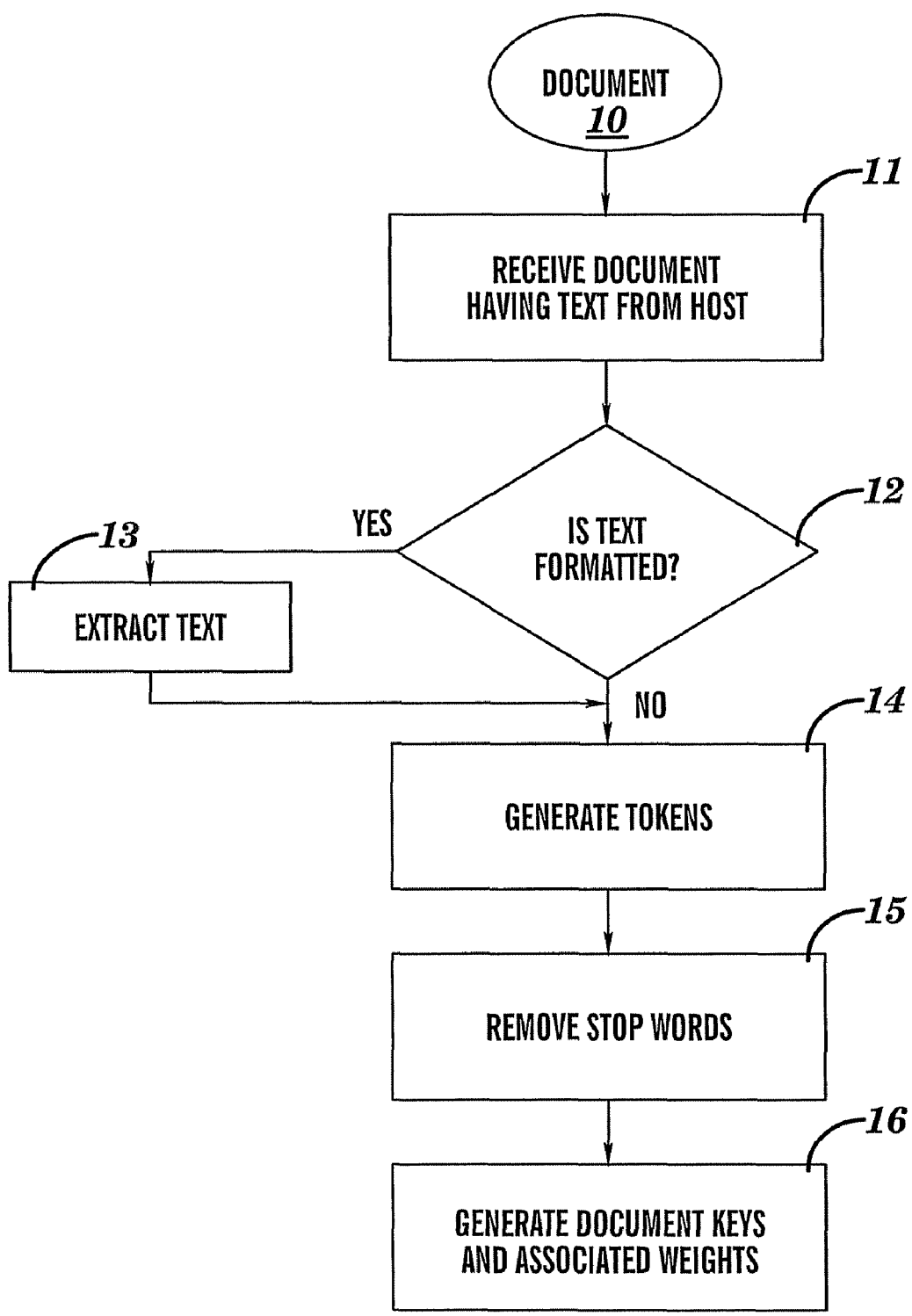
FIG. 1 is a flow chart for generating document keys of a given document, in accordance with embodiments of the present invention.

FIG. 1 is a flow chart for generating document keys of a document 10, in accordance with embodiments of the present invention. The document 10 includes text and the document keys are the generic roots of words and phrases appearing in said text of the document 10. The document 10 is any text document in any application environment such as a document in any commercial word processor environment (e.g., Microsoft Word, WordPerfect®, etc.), a web page accessed through a web browser, etc. The application environment is called a "host" or a "host application".

In step 11, the document 10 is received from the host by a computing system that will subsequently process the text in steps 12-16. Step 12 determines whether the text in the document 10 is formatted (i.e., whether the text appears in a non-text format such as in a format that is specific to the host). If the text is not formatted, then step 14 is next executed. If the text is formatted, then step 13 extracts the text such that the text is separated from its non-text format, and step 14 is next executed. Extracting the text leaves format parameters behind. For example, in a HyperText Markup Language (HTML) document, extracting the text leaves the HTML tags behind. There may be some generic formatting retained (e.g., paragraph breaks), but formatting specific to the host application is removed. The output of step 13 is a text file. The text extraction may be performed by any method known to one of ordinary skill in the art. Additionally, there are software products on the market (e.g., Verify Key View filter) that may be utilized to perform the text extraction.

Step 14 tokenizes the text (i.e., generates tokens from the text). A token is the text that appears between delimiters (blanks, periods, commas, etc.). The output of said tokenizing is a list of tokens such as, inter alia, in an array or vector of tokens.

Step 15 removes stop words from the tokens. Stop words are generic words that have no substantive meaning in relation to the subject content in the document. Examples of stop words include "a", "the", "he", "she". Stop words may be context-dependent (e.g., stop words for E-mail and for instant message chat may be different), since a word may have a meaning in one context but not in another context. Although FIG. 1 shows step 15 as being executed after step 14, the stop words may alternatively be removed from the text prior to execution of the tokenizing of step 14.

Step 16 generates, by stemming, the document keys of the document 10 from the tokens. Stemming is a process that determines the normal form or root of each word or phrase in each token. For example, "changing" has the root "change". Alternative expressions for root words and root phrases are "keywords" and "keyphrases", respectively. Stemming algorithms are known in the art (e.g., the Porter Stemming Algorithm), and any such known stemming algorithm may be used to implement step 16. The document keys generated by step 16 are said roots determined by said stemming. A document key is defined herein as a root word (i.e., keyword) or root phrase (i.e., keyphrase) in the document.

Step 16 also generates weights associated with said document keys on a on-to-one basis. Generating the weights may comprise determining the frequency count of each document key in the document. The frequency count of a document key is the number of appearances of the document key in the document. The weight may be a linear function of the frequency count. For example, the weight may be numerically equal to, or proportional to, the frequency count. Alternatively, the weight may be a nonlinear function of the frequency count. For example, the weight may be proportional to the frequency count raised to a power P wherein P>1 (e.g., P=2). The weights may also take into account the location of the document key in the document. For example, words or phrases appearing at the beginning of the document, or in the document title, or in the document abstract, etc. may have a higher weight than words or phrases located elsewhere in the document. The importance of the location of the document key in the document is context sensitive, since relevance of different locations (e.g., title, abstract, etc.) may depends on the document itself, on the type of document, on the subject matter of the document, etc.

Figure 2:
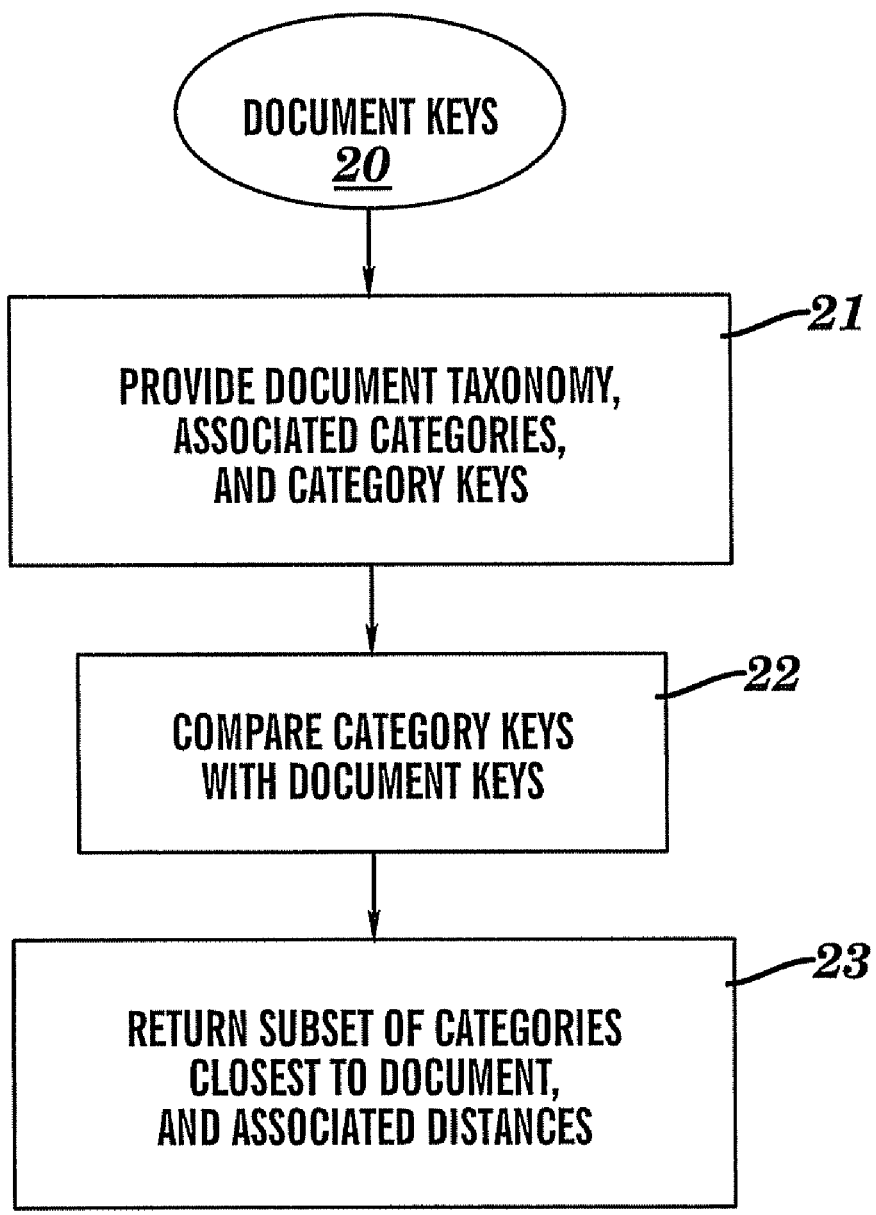
FIG. 2 is a flow chart for determining which categories of a given taxonomy are at a close distance to the document keys of FIG. 1, in accordance with embodiments of the present invention.

FIG. 2 is a flow chart for determining which categories of a given taxonomy are at a close distance to the document keys generated in step 16 of FIG. 1, in accordance with embodiments of the present invention. In FIG. 2, the document keys 20 are the document keys generated in step 16 of FIG. 1. Step 21 provides as input a document taxonomy and categories of the document taxonomy, as well as category keys of each said category. A document taxonomy is a based on a subject matter classification in conjunction with a collection of stored documents, wherein each taxonomy is a general subject area. Each taxonomy comprises categories. Each category comprises both category keys and category weights associated with the category keys on a one-to-one basis. For example, the taxonomy may be "houses", and the categories of "houses" may be "house style" and "house color". The "house style" category may have category keys of "colonial", "ranch", and "split level". The "house color" category" may have category keys of "white", "blue", and "green". The category keys are analogous to the document keys discussed supra. Accordingly, the category keys may comprise root words (i.e., keywords) and root phrases (i.e., keyphrases).

Step 21 also generates weights associated with said category keys on a on-to-one basis. Generating the weights may comprise determining the frequency count of each category key in the stored documents associated with the taxonomy. The frequency count of a category key is the number of appearances of the category key in the stored documents. The weight may be a linear function of the frequency count. For example, the weight may be numerically equal to, or proportional to, the frequency count. Alternatively, the weight may be a linear function of the frequency count. For example, the weight may be proportional to the frequency count raised to a power P wherein P>1 (e.g., P=2). The weights may also take into account the location of the category key in the stored documents.

Step 22 compares the category keys of each category with the document keys 20 to make a determination of a distance D between the document 10 (or equivalently, the document keys 20) and each category as a measure of how close the document 10 (or equivalently, the document keys 20) is to each category. The distance between the document 10 and each category may be computed as a dot product of a vector of the document keys 20 and a vector of the category keys for each category as follows. Let a reference dictionary for the taxonomy encompass all categories of the taxonomy, and all said categories of the taxonomy collectively comprise N category keys, wherein N is a positive integer. Let $V_{DOC}$ represent a vector of order N of the document keys 20 such that each element of $V_{DOC}$ is associated with a unique category key of the reference dictionary, and each element of $V_{DOC}$ contains 1 if there exists a document key of the document keys 20 that matches the category key associated with the element of $V_{DOC}$, or contains 0 otherwise. Let $V_{CAT}(I)$ represent a vector of order N of the $I^{th}$ category of the taxonomy such that each element of $V_{CAT}(I)$ is associated with said unique category key of the reference dictionary, and each element of $V_{CAT}(I)$ contains 1 if there exists a category key of the $I^{th}$ category that matches the category key associated with the element of $V_{CAT}(I)$, or contains 0 otherwise. The distance D(I) between the document 10 (or equivalently, the document keys 20) and the $I^{th}$ category of the taxonomy may be expressed as the dot product of $V_{DOC}$ and $V_{CAT}(I)$; i.e., $D=V_{DOC} \cdot V_{CAT}(I)$. Note that the dot product of two vectors is the summation over the product of corresponding elements of the two vectors, as is conventionally understood in the art of mathematics of vectors. As an example, if N=5, $V_{DOC}=[1, 1, 1, 0, 1]$, and $V_{CAT}(I)=[1, 0, 0, 1, 1]$, then D(I)=3.

The preceding distance D was computed independent of the document weights associated with the document keys 20 and independent of the category weights associated with the category keys provided for each category in step 21. Recalling that a one (1) in $V_{DOC}$ denotes the existence of a document key that matches a category key of the taxonomy dictionary, $V_{DOC}$ could be replaced by the weighted vector $W_{DOC}$ wherein the ones (1) in $V_{DOC}$ are replaced by their associated document weights. Recalling that a one (1) in $V_{CAT}(I)$ denotes the existence of a category key of the $I^{th}$ category that matches a category key of the taxonomy dictionary, $V_{CAT}(I)$ could be replaced by the weighted vector $W_{CAT}(I)$ wherein the ones (1) in $V_{CAT}(I)$ are replaced by their associated category weights. Then the distance D could be represented by various alternative dot products, including $W_{DOC} \cdot V_{CAT}(I)$, $V_{DOC} \cdot W_{CAT}(I)$, and $W_{DOC} \cdot W_{CAT}(I)$.

As an example, consider the "houses" taxonomy, discussed supra. For this example, let N=6 and the pertinent vectors have elements representing the sequentially ordered 6 category keys of the taxonomy "houses" dictionary: "colonial", "ranch", and "split level", "white", "blue", and "green". Assume that the document keys 20 include document keys of only "ranch", "white", and "blue" with associated weights 2, 3, and 1, respectively. Category (1) of taxonomy "houses" are assumed to have category keys of "colonial", "ranch", and "split level" with associated category weights of 1, 2, and 3, respectively, in this example. Category (2) of taxonomy "houses" are assumed to have category keys of "white", "blue", and "green" with associated category weights of 2, 2, and 1, respectively, in this example. Then, the pertinent vectors are:

$V_{DOC}=[0, 1, 0, 1, 1, 0]$
$W_{DOC}=[0, 2, 0, 3, 1, 0]$
$V_{CAT}(1)=[1, 1, 1, 0, 0, 0]$
$W_{CAT}(1)=[1, 2, 3, 0, 0, 0]$
$V_{CAT}(1)=[0, 0, 0, 1, 1, 1]$
$W_{CAT}(2)=[0, 0, 0, 2, 2, 1]$

The various dot products for this example are:

$V_{DOC} \cdot V_{CAT}(1)=1$
$V_{DOC} \cdot W_{CAT}(1)=2$
$W_{DOC} \cdot V_{CAT}(1)=2$
$W_{DOC} \cdot W_{CAT}(1)=4$ $V_{DOC} \cdot V_{CAT}(2)=2$
$V_{DOC} \cdot W_{CAT}(2)=4$
$W_{DOC} \cdot V_{CAT}(2)=4$
$W_{DOC} \cdot W_{CAT}(2)=8$ In this example, if the weights are neglected then $D(1)=V_{DOC} \cdot V_{CAT}(1)=1$ and $D(2)=V_{DOC} \cdot V_{CAT}(2)=2$, so that the document 10 is closer to category 1 than to category 2 by a factor of 2.

Step 23 returns a subset of the categories to the host that provided the document 10, such that the returned subset includes those categories that are closest to the document 10 along with their associated distances from the document 10. The number of such categories returned may be based on any criteria, such as a predetermined number of categories, a predetermined percentage of the categories, categories having a distance below a predetermined threshold distance, etc. The returned categories may be returned in any form such as a file of categories, a printout of the categories, a display of the categories such that a user can use the categories to link to documents related to the categories, etc.

Figure 3:
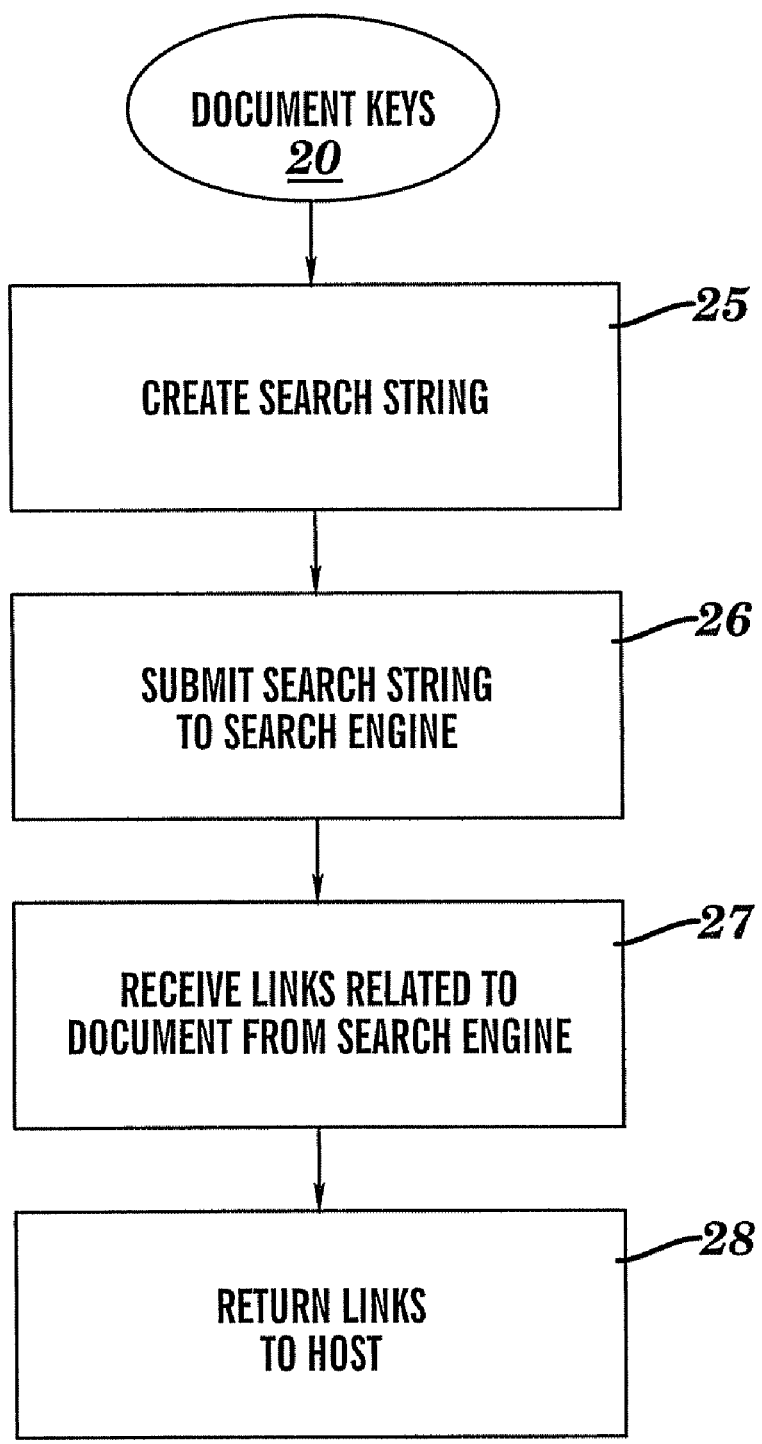
FIG. 3 is a flow chart for determining links to documents based on the document keys of FIG. 1, in accordance with embodiments of the present invention.

FIG. 3 is a flow chart for determining links to documents based on the document keys generated in step 16 of FIG. 1, in accordance with embodiments of the present invention. In FIG. 3, the document keys 20 are the document keys generated in step 16 of FIG. 1. Step 25 creates a search string. The search string comprises a logical function of a subset of the document keys 20. The subset may include all of the document keys or less than all of the document keys. The subset may be determined by any criteria, including criteria that depend on the weights associated with the document keys. The number of such document keys in the subset may be based on any criteria, such as a predetermined number of document keys, a predetermined percentage of the document keys, document keys having an associated weight above a predetermined threshold weight, etc. When the subset comprises less than all of the document keys, the specific document keys in the subset may be based on the respective weights such that the highest weighted document keys are used in the search string and the remaining document keys are not used in the search string. If the subset comprises document keys $K_1, K_2, \ldots K_M$ ($M \geqq 2$), then the logical function may be, inter alia, $\{K_1 \text{ AND } K_2, \ldots \text{ AND } K_M\}$ or $\{K_1 \text{ OR } K_2, \ldots \text{ OR } K_M\}$. A default type of search string, or a default algorithm for generating the search string, may be configurable and thus subject to control by the user. The default search string may be automatically generated in accordance with the default algorithm.

Step 26 submits the search string to a search engine or to multiple search engines. Step 27 receives links to documents related to the document 10 (i.e., to the document keys 20) from the search engine or from the multiple search engines. Since the search engine or multiple search engines utilized the search string for performing the search(es), the links received from the search engine or from the multiple search engines are based on the search string. Step 28 returns the links to the host that provided the document 10. The returned links may be returned in any form such as a file of links, a printout of the links, a display of the links such that a user can use the links to link to the documents related to the document 10. Additionally, the steps of FIGS. 1-3 may be may be re-utilized by being applied to any found document previously determined from steps 25-28 to be related to the document 10. Such re-utilization of the steps of FIGS. 1-3 may be accomplished by applying steps 11-16 of FIG. 1 to said found document to generate the document keys 20 in step 16, followed by applying at least one of the following step sequences to the document keys 20 associated with said found document: the sequence of steps 21-23 in FIG. 2 and the sequence of steps 25-28 in FIG. 3.

Figure 4:
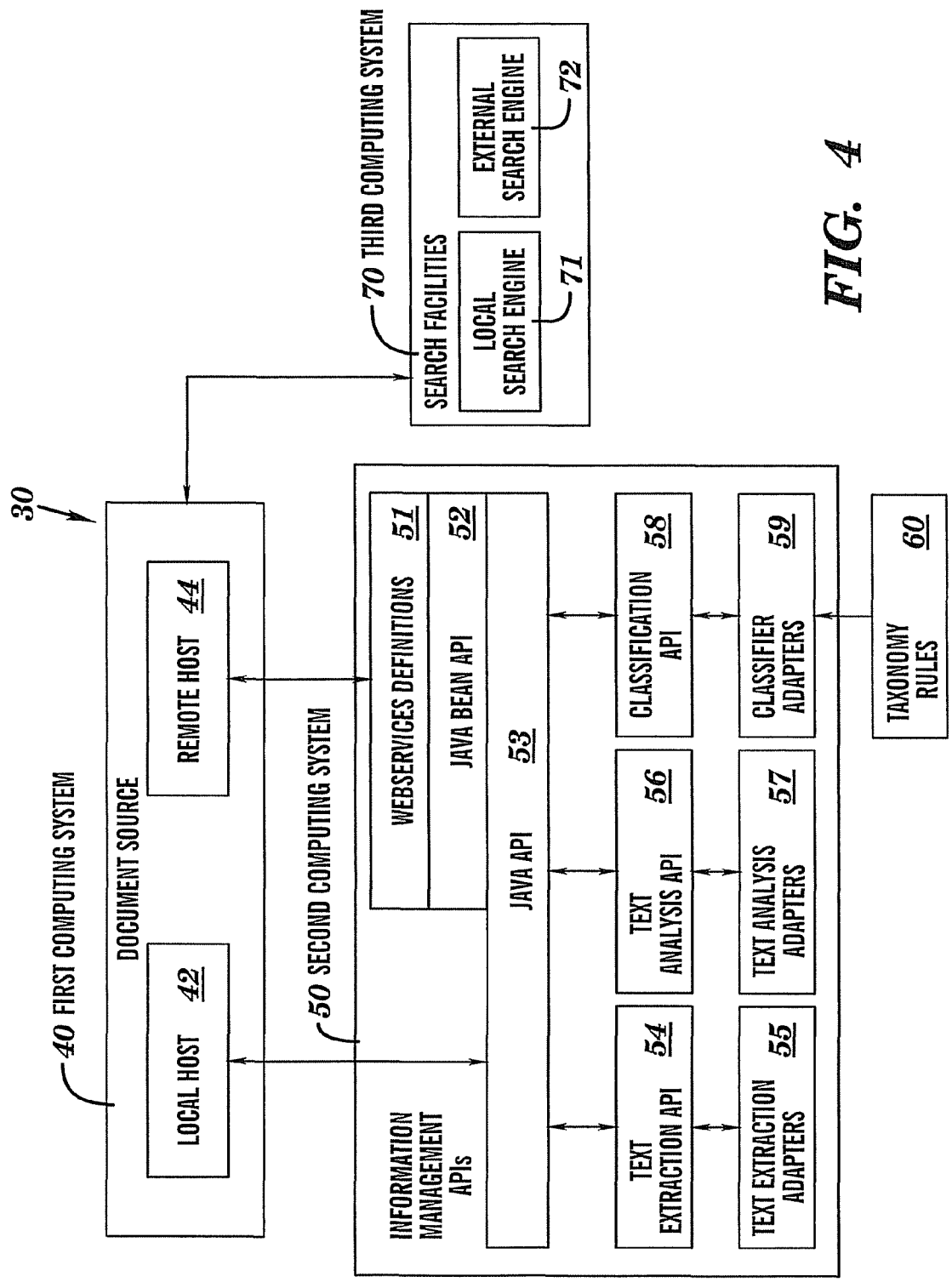
FIG. 4 depicts a system for determining categories and document links relating to the given document of FIG. 1, in accordance with embodiments of the present invention.

FIG. 4 depicts a system 30 for determining categories and document links relating to the document 10 of FIG. 1, in accordance with embodiments of the present invention. The document 10 of FIG. 1 may be a text document in any application environment such as a document in any commercial word processor environment (e.g., Microsoft Word, WordPerfect, etc.), a web page accessed through a web browser, etc. The application environment is called a "host" or a "host application". The system 30 comprises a first computing system 40, a second computing system 50, and a third computing system 70.

The first computing system 40 comprises a host which is a source of the given document to be processed in accordance with the present invention. The host may be a local host 42 or a remote host 44. The local host 42 is local to the second computing system 50. The remote host 44 is remote the second computing system 50.

The second computing system 50 receives and processes the given document from the first computing system 40. The second computing system 50 comprises an Information Management Application Programming Interfaces (APIs) which encapsulate three types of services: text extraction, text analysis, and classification. The text extraction relates to step 13 of FIG. 2 and includes a text extraction API 54 interfacing a text extraction adapter 55 which is a text extraction tool. The text analysis relates to steps 14-16 of FIG. 1 and includes a text analysis API 56 interfacing a text analysis adapter 57 which is a set of text analysis tools associated with steps 14-16 of FIG. 2. The classifiers relate to steps 21-23 of FIG. 2 and includes a classification API 58 interfacing classifier adapters 59 which implement steps 21-23 of FIG. 12. The classifier adapters 59 have access to taxonomy rules 60, which may be stored in a database, file, table or tables, etc. An example of a taxonomy rule of the taxonomy rule 60 is a specification of the category keys of a category. See FIG. 2 supra and accompanying text for a discussion of category keys of a category.

A Java API 53 directly interfaces the local host 42 to said text extraction, text analysis, and classification. The Java API 53 indirectly interfaces the remote host 44 to said text extraction, text analysis, and classification, inasmuch as the Java API 53 is wrapped in a Java Bean API 52 which is wrapped in WebServices Definitions 51. Thus the WebServices Definitions 51 serves as a direct interface with the remote host 44 and allows the remote host 44 to access the text extraction, text analysis, and classification through whatever Remote Procedure Call (RPC) mechanism is defined in the WebServices Definitions 51.

The third computing system 70 comprises Search Facilities that relate to the search engine of steps 26-27 of FIG. 3. The Search Facilities of the third computing system 70 may comprise a local search engine 71 or an external search engine 72. The local search engine 71 is local to the first computing system 40 (e.g., an operating system that indexes files in a file system and has a search interface). The external search engine 72 is external to the first computing system 40 (e.g., an Internet search engine).

Although the first computing system 40, the second computing system 50, and the third computing system 70 are shown in FIG. 4 as separate computer systems, the first computing system 40 and the second computing system 50 may each be included within a first same computing system. Similarly, the first computing system 40 and the third computing system 70 may each be included within a second same computing system. Additionally, the first computing system 40, the second computing system 50, and the third computing system 70 may each be included within a third same computing system.

Figure 5:
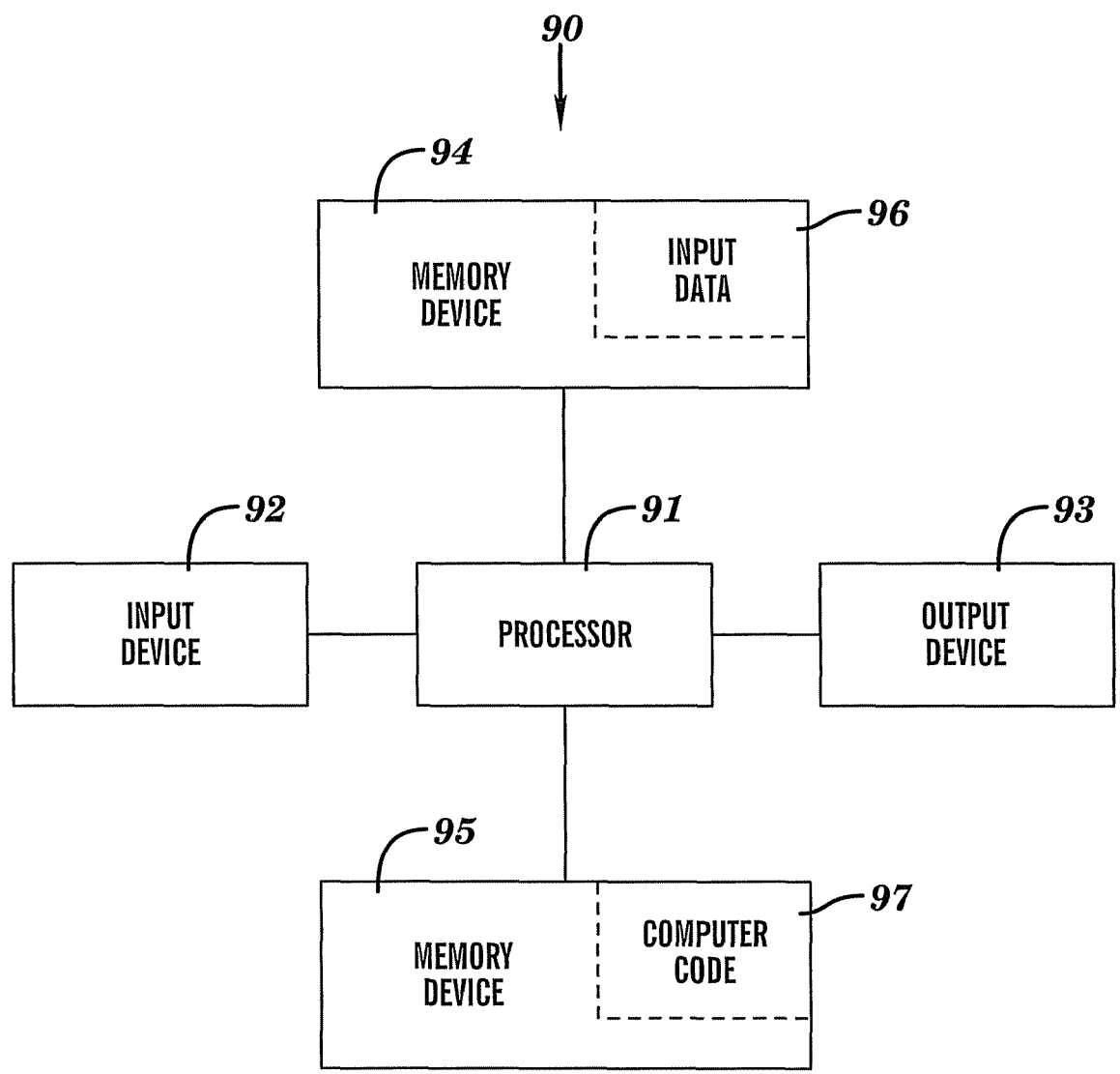
FIG. 5 depicts a computing system for determining categories and document links relating to a given document, in accordance with embodiments of the present invention.

FIG. 5 illustrates a computer system 90 for determining categories and document links relating to a given document, in accordance with embodiments of the present invention. The computer system 90 may represent, inter alia, any of the following computing systems of FIG. 4: the first computing system 40, the second computing system 50, or the third computing system 70. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a dynamic random access memory (DRAM), a read-only memory (ROM), etc. The memory device 95 includes a computer code 97. The computer code 97 comprises at least one algorithm whose functionality depends on which of the first computing system 40, the second computing system 50, and the third computing system 70 is represented by the computer system 90. For example, if the computer system 90 represents the second computing system 50 then the at least one algorithm comprised by the computer code 97 may have the functionality of any or all of the text extraction adapters 55, the text analysis adapters 57, and the classifier adapters 59 of FIG. 4. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 5) may be used as a computer usable medium having a computer readable program code embodied therein, wherein the computer readable program code comprises the computer code 97.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer system comprising a processor and a computer readable memory unit coupled to the processor, said memory unit containing program code configured to be executed by the processor to implement a method for document analysis and retrieval, said method comprising:
   receiving a document having text therein from a host of a first computing system;
   generating document keys associated with said text from analysis of said text, each said document key selected from the group consisting of a keyword of said text and a keyphrase of said text;
   providing a document taxonomy having categories, each category having category keys, each said category key selected from the group consisting of a keyword of said category and a keyphrase of said category;
   comparing the category keys of each category with said document keys to make a determination of a distance between the document and each category as a measure of how close the document is to each category, wherein said comparing comprises computing said distance for each category as a dot product of a vector of said document keys and a vector of said category keys for each category; and
   returning a subset of said categories to said host, wherein said subset of said categories reflects said determination.

2. A computer system comprising a processor and a computer readable memory unit coupled to the processor, said memory unit containing program code configured to be executed by the processor to implement a method for document analysis and retrieval, said method comprising:
   receiving a document having text therein from a host of a first computing system;
   generating document keys associated with said text from analysis of said text, each said document key selected from the group consisting of a keyword of said text and a keyphrase of said text;
   providing a document taxonomy having categories, each category having category keys, each said category key selected from the group consisting of a keyword of said category and a keyphrase of said category;
   comparing the category keys of each category with said document keys to make a determination of a distance between the document and each category as a measure of how close the document is to each category; and
   returning a subset of said categories to said host, wherein said subset of said categories reflects said determination, said method further comprising:
   generating document weights, wherein each document weight is associated with a corresponding document key of said document keys, and wherein each document weight is a measure of the importance of its corresponding document key in comparison with the other document keys of the document; and
   providing category weights for each category, wherein each category weight is associated with a corresponding category key of said category keys, wherein each category weight is a measure of the importance of its corresponding category key in comparison with the other category keys of the category, and wherein said comparing comprises computing said distance for each category as a dot product of a vector of said document weights and a vector of said category weights for each category.

3. The computer system of claim 2, wherein the document weights are a linear function of the number of appearances of the corresponding document keys in the document.

4. The computer system of claim 2, wherein the document weights are a nonlinear function of the number of appearances of the corresponding document keys in the document.

\* \* \* \* \*